US005201391A

United States Patent [19]

Arai et al.

[11] Patent Number: 5,201,391
[45] Date of Patent: Apr. 13, 1993

[54] DRIVING APPARATUS FOR TELESCOPIC ANTENNA AND OVERLOAD PREVENTION CLUTCH MECHANISM APPLICABLE TO THE SAME

[75] Inventors: Kureo Arai, Takasaki; Masamitsu Kojima, Fujisawa; Kazuo Kato, Yamato, all of Japan

[73] Assignees: Yokowo Co., Ltd.; Oiles Corporation, both of Tokyo, Japan

[21] Appl. No.: 819,847

[22] Filed: Jan. 13, 1992

[30] Foreign Application Priority Data

Jan. 19, 1991 [JP] Japan .................................... 3-19448
May 29, 1991 [JP] Japan .................................... 3-48402
Sep. 30, 1991 [JP] Japan .................................... 3-278295

[51] Int. Cl.[5] ............................................... F16D 31/08
[52] U.S. Cl. ................................ 192/58 B; 192/56 F; 343/901
[58] Field of Search ................. 192/58 B, 56 R, 56 F; 343/901, 902

[56] References Cited

U.S. PATENT DOCUMENTS

| | | | |
|---|---|---|---|
| 1,334,856 | 3/1920 | Hayes et al. | 192/58 B |
| 2,020,002 | 11/1935 | Schweich | 192/58 B |
| 2,080,279 | 5/1937 | Kellogg | 192/58 B |
| 2,253,001 | 8/1941 | Webb et al. | 192/58 B |
| 2,688,698 | 9/1954 | Gosline | 343/902 X |
| 4,050,559 | 9/1977 | Andrews et al. | 192/58 B |
| 4,103,515 | 8/1978 | Barrett | 192/58 B X |
| 4,432,254 | 2/1984 | Schultz | 192/58 B X |
| 4,782,930 | 11/1988 | Kuroiwa et al. | 192/58 B X |
| 4,796,733 | 1/1989 | Nakayama | 192/58 B X |

FOREIGN PATENT DOCUMENTS

| | | |
|---|---|---|
| 50-36912 | 11/1975 | Japan . |
| 57-21122 | 5/1982 | Japan . |
| 57-26405 | 6/1982 | Japan . |
| 58-13601 | 3/1983 | Japan . |
| 60-22649 | 7/1985 | Japan . |
| 63-121909 | 8/1988 | Japan . |
| 63-131207 | 8/1988 | Japan . |
| 64-3208 | 1/1989 | Japan . |
| 64-3209 | 1/1989 | Japan . |
| 1-204503 | 8/1989 | Japan . |
| 2-90506 | 7/1990 | Japan . |
| 3-16710 | 2/1991 | Japan . |

*Primary Examiner*—Rodney H. Bonck
*Assistant Examiner*—Andrea Pitts
*Attorney, Agent, or Firm*—Nixon & Vanderhye

[57] ABSTRACT

A driving apparatus for telescopic antenna, including an electric motor, a driving clutch member connected to the motor to be rotated by the motor, a driven clutch member opposite to the driving clutch member to define a viscous fluid containing space in association with the driving clutch member and connected to a telescopic antenna to extend and contract the telescopic antenna, and a viscous fluid contained in the viscous fluid containing space.

5 Claims, 3 Drawing Sheets

DRIVING APPARATUS FOR TELESCOPIC ANTENNA AND OVERLOAD PREVENTION CLUTCH MECHANISM APPLICABLE TO THE SAME

BACKGROUND OF THE INVENTION

The present invention relates to a driving apparatus for telescopic antenna equipped to automotive vehicle or the like and to a mechanism for preventing an overload and being applicable to the driving apparatus.

One of overload prevention clutches for the driving apparatus, is provided with driving and driven clutch plates each of which is urged by spring means, and which are formed with rugged surfaces on opposing contact surfaces thereof to transmit the driving force of an electric motor from the driving end to the driven end therethrough, wherein the rugged surface of the driving clutch plate is run on the rugged surface of the driven clutch plate while the driving clutch plate is rotated relative to the driven clutch plate in an over load state.

In another of the overload prevention clutches, the driving and driven clutch plates have flat surfaces which are slidably contacted with each other under a spring-urged state to transmit the driving force generated from the electric motor from the driving end to driven end by means of friction therebetween, wherein the driving clutch plate is slipped onto the driven clutch plate to prevent the electric motor from the overloading.

In accordance with the first overload prevention clutch in which both clutch plates are formed with the rugged portions on the opposing contact surfaces thereof, since the rugged surface of the driving clutch plate is run on the rugged surface of the driven clutch plate in overload state of the clutch as described above and then is restored in a normal state where the driving clutch is meshed with the driven clutch on rugged surfaces thereof, and hereafter the operation is repeated in the clutch until the feeding of electric power to the electric motor is stopped or an overload is eliminated, the clutch generates a discordant sound such as an impact sound. Therefore, the conventional overload prevention clutch does not fit a passenger car in which silent operation is required.

In accordance with the second overload prevention clutch in which the clutch plates are contacted on the plane surfaces thereof to each other, there is no noise generated by the running of the rugged surface of the driving clutch plate on the rugged surface of the driving clutch plate. However, an invasion of water, mud or grease into a gap between the plane surfaces of the two clutch plates makes it difficult for the clutch to transmit a driving force from the driving end to the driven end and there is a fear that the electric motor maybe damaged. In particular, when the overload prevention clutch is applied to a passenger car which is used in adverse circumstances where water, mud or grease or the like violently splashes and temperature and humidity greatly change, it is difficult to avoid the above-described problems in the power transmission.

In addition, since the two clutch plates of each of the conventional overload prevention clutches are directly contacted to each other by means of relatively powerful spring force, a long-term use of that clutch causes the contact surfaces to be worn to degrade transmission capability. Thus, both the overload prevention clutches is poor in durability.

SUMMARY OF THE INVENTION

An object of the present invention is to provide an overload prevention clutch mechanism applicable to a driving apparatus for extending and contracting a telescopic antenna, the clutch mechanism generating no discordant sound even in an overload state and being preferably applicable to passenger cars in which silent operation is required, and further the driving apparatus having the overload prevention clutch mechanism.

Another object of the present invention is to provide an overload prevention clutch mechanism applicable to a driving apparatus for extending and contracting a telescopic antenna, the mechanism performing a desired clutching function with no abrasion even under adverse circumstances, and also the driving apparatus having the overload prevention clutch mechanism.

The above objects of the present invention are achieved by an overload prevention clutch mechanism applicable to a driving apparatus for a telescopic antenna, the mechanism comprising a driving clutch member, a driven clutch member opposing to the driving clutch member to define a space for containing a viscous fluid in association with the driving clutch member, and a viscous fluid contained in the viscous fluid containing space.

Also, the above objects of the present invention are achieved by a driving apparatus for electrically driving telescopic antenna, comprising an electric motor, a driving clutch member connected to the electric motor to be rotated by the electric motor, a driven clutch member opposing to the driving clutch member to define a space for containing viscous fluid in association with the driving clutch member and connected to the telescopic antenna to extend and contract the telescopic antenna, and a viscous fluid contained in the viscous fluid containing space.

The driving clutch member may be the so-called clutch disc but is not restricted to the disc, it may have appropriate shapes such as hollow or solid cylindrical shape or a conical shape. In addition, the driving clutch member need not be one-piece but may comprise an assembly of two or more elements. The clutch member may be made of any suitable material, e.g., a synthetic resin or a metal such as aluminum, preferably made of hard plastics.

In one embodiment of the present invention, the driving clutch member may be connected to the electric motor not only by means of a gear assembly including a worm gear but also directly to the electric motor without a gear assembly. An ordinary direct current motor or an ultrasonic motor appropriate to direct coupling may be applied as the electric motor.

The above description for the embodiment of the driving clutch member is essentially applicable to an embodiment of the driven clutch member. Therefore, shapes of the driven clutch member correspond to those of the driving clutch member. In the present invention, the driven clutch member is opposed to the driving clutch member to define the space for containing the viscous fluid in association with the driving clutch member. The opposite arrangement concerning the clutch members is not restricted in a case where plane surfaces are opposed to each other. For example, the driving clutch member may be arranged opposite to the driven clutch member to envelope the same. On the other hand, the driven clutch member may be arranged opposite to the driving clutch member to envelope the same. Thus, the resulting viscous fluid containing space may have various configurations in accordance with the above opposed arrangements.

The viscous fluid containing space is preferably thin in thickness and has a large surface area in a case where the viscous shear resistance of the contained viscous fluid therein is intended to be primarily utilized in operation. In other words, the viscous fluid in the space is preferably in a form of a thin layer or a film widely expanding between the opposed driving and driven clutch members. One example of the thin layer of the viscous fluid is 0.05 mm to 1 mm in thickness but is not restricted to that value. For example, the thickness of the fluid layer may be more than 1 mm where a high viscous fluid is accommodated in the space. On the other hand, when the clutch is produced with high accuracy in mechanical dimension, the thickness may be less than 0.05 mm. When other viscous resistances of the viscous fluid other than or in addition to the shear resistance is intended to be effectively utilized in operation, numerous irregularities may be provided on the surface of the viscous fluid containing space, i.e., the surfaces of the driving and driven clutch members defining the viscous fluid containing space. For example, numerous projection, fins or plates for baffling flow of fluid are provided on the opposite surfaces of the driving and driven clutch members defining the viscous fluid containing space. The viscous fluid containing space may be have various configurations such as, disc-shaped or cylindrical forms.

In one embodiment of the present invention, the driving clutch member has a cylindrical surface and the driven clutch member has a cylindrical surface opposite to the cylindrical surface of the driving clutch member and the cylindrical surfaces of the driving and driven clutch members define the space for accommodating the viscous fluid therebetween. In one embodiment of the overload prevention clutch mechanism of the present invention in which the driving force is transmitted through the driving clutch member to the driven clutch member, the viscous fluid containing space is the form of a hollow cylinder having a uniform thickness and expands along the direction of rotation of the driving clutch member. In an alternative embodiment of the overload prevention clutch mechanism according to the present invention, one end of the cylindrical surface of each of the driving and driven clutch members is larger in diameter than the other end of the cylindrical surface of the same.

The viscous fluid to be accommodated in the viscous fluid containing space preferably has such a high viscosity that the fluid can provide sufficient viscous resistances such as a flow resistance and/or a shear resistance. It is preferably a nonfreezing fluid such as silicone oil so as to stably operate especially in a cold northern district. No air is preferably contained in the viscous fluid for stable transmission of the driving force. Therefore, the space is preferably filled up with the viscous fluid in order to prevent air from being contained due to a vibration of the surface of the viscous fluid although it need not fill up the space with the viscous fluid.

According to the present invention, the driven clutch member is connected to the telescopic antenna to extend and contract the antenna on the rotation thereof. It is an one embodiment that the driven clutch member is connected to the antenna by means of a gear assembly including a rack with teeth. The present invention is not restricted to that embodiment, for example, may include further embodiment in which the driven clutch member is connected to the antenna by means of a frictional contact.

In the clutch mechanism according to the present invention, since the driving and driven clutch members are opposed to each other across the viscous fluid in the viscous fluid containing space, the driving force is transmitted from the driving clutch member to the driven clutch member by means of the viscous fluid in the viscous fluid containing space in the operation with normal load, and the driving clutch member is idled through the viscous fluid in overload state.

According to the present invention, since the driving clutch member arranged in the driving end and the driven clutch member arranged in the driven end are interconnected by means of the viscous fluid in the viscous fluid containing space, the clutch mechanism produces no discordant sound such as an impact sound even during overload state, and therefore, is applicable to passenger car requiring high stillness, and is durable.

The above objects and features and other objects and features of the present invention will be apparent from the following detailed description of preferred embodiments given with reference to the accompanying drawings.

DESCRIPTION OF THE PREFERRED EMBODIMENTS

Figure 1:
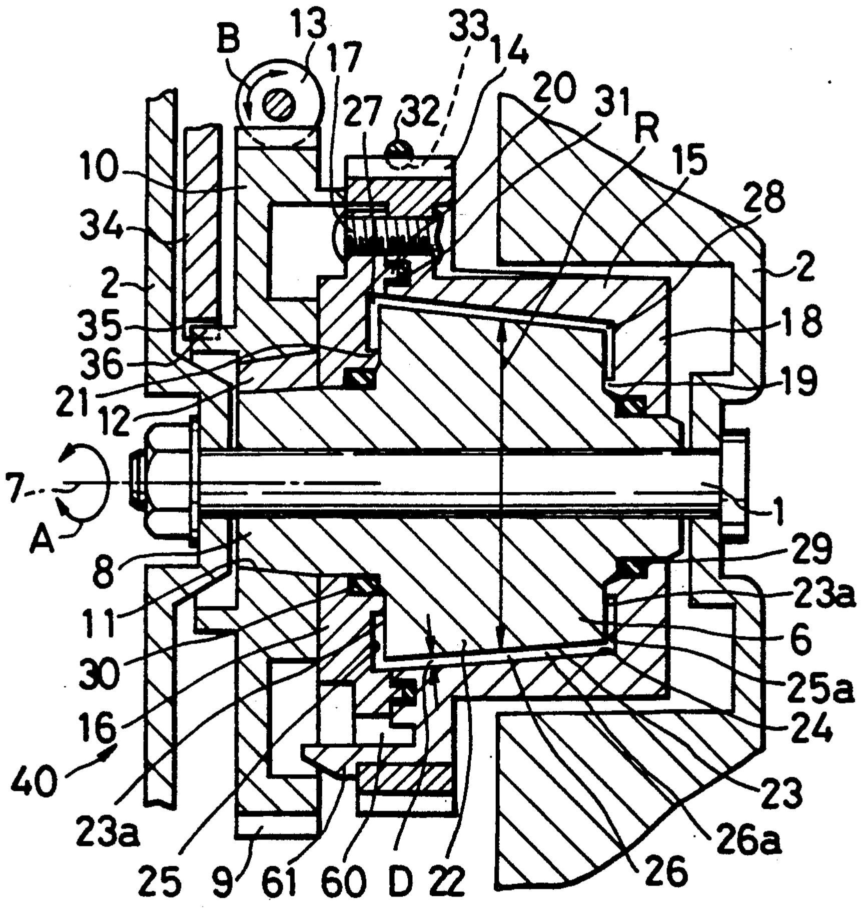
FIG. 1 is a longitudinal section of a first preferred embodiment of the present invention.
Figure 2:
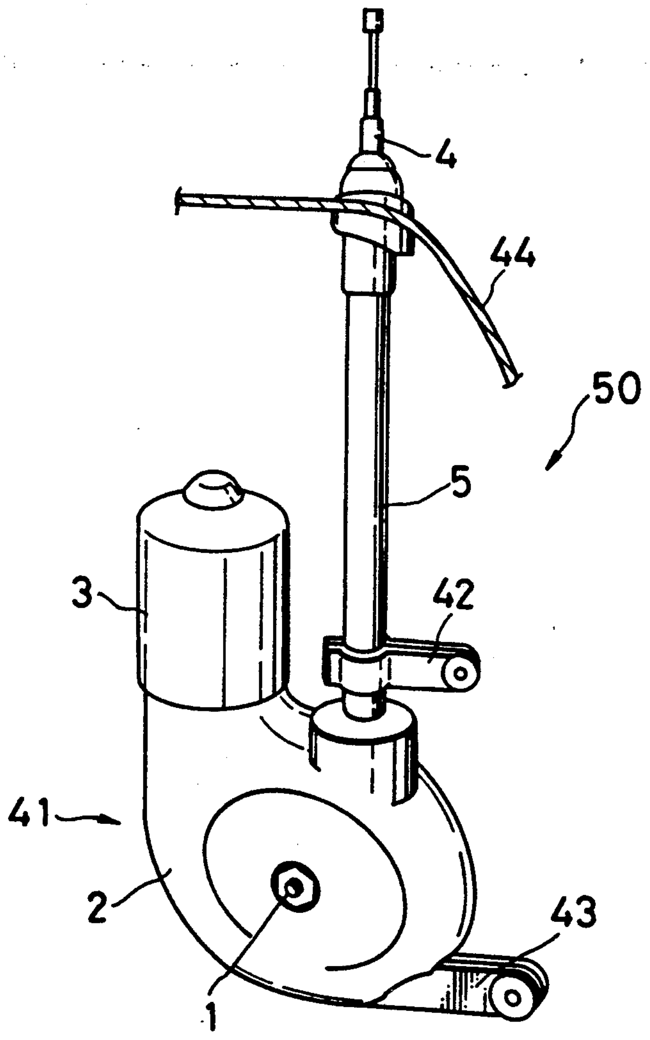
FIG. 2 is a perspective view of a driving apparatus having the clutch mechanism of FIG. 1.

In FIGS. 1 and 2, an electric motor 3 as a driving source and a tubular antenna-housing 5 for housing a telescopic antenna 4 are fastened to a housing 2 through which a fixed shaft 1 passes. The fixed shaft 1 is rotatably provided with a rotator 6 which can be rotated about a center axis 7 in the direction of the arrow A. A tubular portion 8 of the rotator 6 is fitted into a central hole 11 in a gear 10 the outer periphery of which is formed with teeth 9, so that the rotator 6 can be rotated in the direction of the arrow A together with the gear 10. A key or projection 12 is provided in the central hole 11 and between the tubular portion 8 and the gear 10 in order to ensure the integral rotation of an assembly of the gear 10 and the rotator 6 as a driving clutch member arranged in a driving end. Teeth 9 are meshed with a worm gear 13 mounted rigidly to the output shaft of the electric motor 3.

A bottomed hollow cylinder 15, the outermost periphery of which is formed with teeth 14, is fixed with a lid 16 to the open end thereof by means of pins or screws 17. The bottom portion 18 of the cylinder 15 and the lid 16 are provided with annular projections 19, 20 and 21 on inner surfaces thereof. The assembly of the cylinder 15 and the lid 16 as a driven clutch member arranged in a driven end surrounds an expanded conical portion 22 of the rotator 6 and is rotatable relative to the rotator 6 in the direction of the arrow A. A viscous fluid containing space 26*a*, for example, in the form of cone is defined by a conical outer surface 23 and opposite annular end surfaces 23*a* of the expanded portion 22, and a conical inner surface 24 of the cylinder 15 opposite to the conical outer surface 23 and an annular inner surface 25*a* of the bottom 18 of the cylinder 15 and an annular inner surface 25 of the lid 16 opposing to the annular end surfaces 23*a* respectively. The embodiment is so formed that the viscous fluid containing space 26*a* defined between the conical surfaces 23 and 24 is progressively decreased in diameter R from a position 27 to a position 28 to effectively produce a viscous shear resistance from a contained viscous fluid therein. Accordingly, the expanded portion 22 and the cylinder 15 are so formed that diameters of the conical surfaces 23 and 24 of the expanded portion 22 and the cylinder 15 at the position 27, i.e., diameters of one annular end of the conical surfaces 23 and 24 are larger than diameters of the conical surfaces 23 and 24 at the position 28, i.e., diameters of the other annular end of the conical surfaces 23 and 24. In this embodiment, the viscous fluid containing space 26*a* is filled with silicone oil as the viscous fluid. The projections 19 and 21 are in slidable contact with the end surfaces of the expanded portion 22 so as to be movable relative to the expanded portion 22 in the direction of the arrow A, and O-rings 29 and 30 as seal rings are fitted between the rotator 6 and the assembly of the cylinder 15 and the lid 16 constituting the driven clutch member defining the viscous fluid containing space in association with the opposite driving clutch member in order to make the viscous fluid containing space 26*a* liquid-tight. An O-ring 31 is fitted between the projection 20 and the open end of the cylinder 15 in order to make the viscous fluid containing space 26*a* liquid-tight. In this embodiment, the viscous fluid containing space 26 is 1 mm or less in thickness D and has the same thickness at any position in the direction A. The teeth 14 of the cylinder 15 are meshed with rack teeth 33 of a drive cord 32. The drive cord 32 is connected to the telescopic antenna 4.

A disc 34 mounted rotatably to the housing 2 has teeth 35 meshed with teeth 36 which is formed on circular projection projecting from an outer end surface of the gear 10. Thus, the disc 34 with switch is rotated based on the rotation of the gear 10.

A driving apparatus 41 comprising the electrical motor 3 and a clutch mechanism 40 mounted in the housing 2 is mounted to the body of an automotive vehicle by means of mounting member 42 and 43, wherein the top end of the antenna housing 5 passes through and is fastened to a fender panel 44 of an automotive vehicle.

A motor-operated telescopic antenna assembly 50 comprising the telescopic antenna 4 and the driving apparatus 41 is operated as follows:

When the electrical motor 3 is activated, the worm gear 13 is rotated in the direction of the arrow B. The gear 10 meshed with the worm gear 13 is in turn rotated in the direction of the arrow A. Also, the rotator 6 fastened to the gear 10 is concurrently rotated in the direction of the arrow A. The rotation of the rotator 6 produces a viscous shear resistance in the viscous fluid in the viscous fluid containing space 26*a*. Accordingly, the viscous fluid in the fluid containing space 26*a* is flowed in the direction of the arrow A as the rotator 6 is rotated. The cylinder 15 and the lid 16 in which the conical inside surface 24 and the annular inner bottom surface 25*a*, and the annular inner surface 25 are in contact with the viscous fluid in the viscous containing space 26*a* are in turn rotated in the direction of the arrow A. The cylinder 15 pulls out or in the drive cord 32 by means of the mesh of the teeth 14 with the rack teeth 33 upon rotation thereof to extend or contract the telescopic antenna 4. Once the telescopic antenna 4 reaches an upper or lower limit in length thereof, the disc 34 which has been rotated by the predetermined angles issues an electrical signal to stop feeding electrical power to the electric motor 3 by means of the electrical switch which is associated with the disc 34.

Since the driving apparatus 41 is adapted to transmit a torque of the rotator 6 to the assembly of the cylinder 15 and the lid 16 by means of the viscous fluid in the viscous fluid containing space 26*a*, especially, the viscous fluid containing space 26 in the form of a hollow cone, the viscous fluid is sheared once the telescopic antenna 4 has reached the upper or lower limit in length during the telescopic movement of the telescopic antenna 4 where the telescopic antenna 4 is unable to be telescoped over that limit, and then a shearing force of a predetermined value or more is applied to the viscous fluid. Therefore, the rotator 6 is rotated relative to the assembly of the cylinder 15 and the lid 16, i.e., is idled in the direction of the arrow A. Since the driving apparatus 41 causes the rotator 6 to rotate relative to the assembly of the cylinder 15 and the lid 16 by means of the viscous fluid in the viscous fluid containing space 26*a*, the driving apparatus 41 causes no discordant sound even during idling, i.e., overload state. In addition, since the assembly of the cylinder 15 and the lid 16 is out of contact with the rotator 6, the relative rotation of the rotator 6 produces no abrasion between rotator 6 and the assembly of the cylinder 15 and the lid 16. Thus, the driving apparatus 41 can be stably operated for a long period.

In above embodiment according to the invention, the cylinder 15 and the lid 16 are rigidly interconnected by means of the pin or screw 17. However, the present invention is not restricted to this arrangement. For example, the clutch mechanism 40 may be provided with a snap-fit arrangment in which the lid 16 has a through hole 60 and a snap-fit portion 61 passing through the through hole 60 is formed integrally to the cylinder 15 so that the lid 16 is detachably fitted to the cylinder 15. This arrangement is preferable in a case where a facility of an assembly and a maintenance of the clutch mechanism is required.

Figure 3:
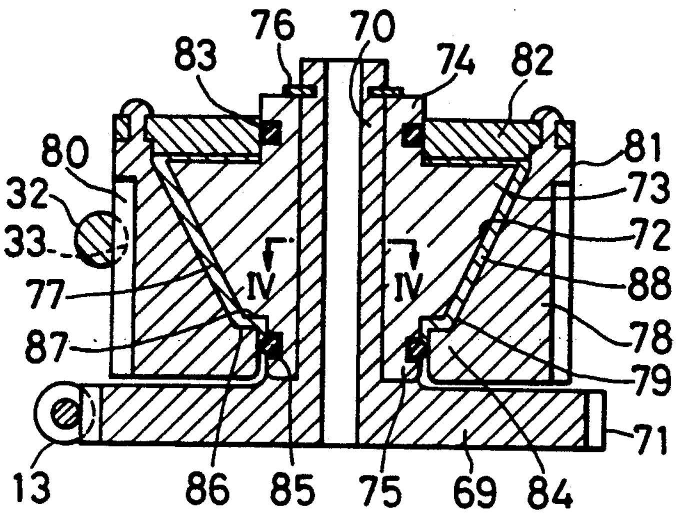
FIG. 3 is a longitudinal section of other preferred embodiment of the present invention.
Figure 4:
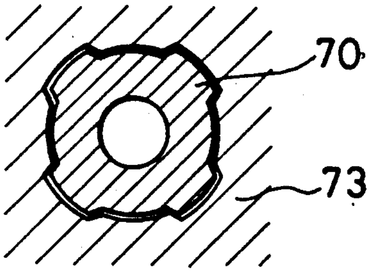
FIG. 4 is a sectional view taken along line IV—IV in FIG. 3.

Another embodiment of the present invention will be described with reference to FIGS. 3 through 5 hereinafter. As shown in FIG. 3, a clutch mechanism of this embodiment includes an integrated assembly of a gear 69 and a hollow shaft 70. The gear 69 is integrally formed on the periphery thereof with a worm wheel 71 which is meshed with a worm gear 13 rotated by the electric motor 3.

The hollow shaft 70 is fitted with a generally conical rotator 73 having a conical outer surface 72 tapered with a predetermined gradient, and having a reduced-diameter portion 74 and 75 on upper and lower ends of the conical outer surface 72 respectively. A ring 76 is fitted into an end of the hollow shaft 70 to be in contact with an end surface of the upper reduced-diameter portion 74 and to thereby inhibit a longitudinal movement of the rotator 73. The rotator 73 is engaged to the hollow shaft 70 by means of a spline as shown in FIG. 4 to constitute a driving member rotated together with the hollow shaft 70.

A hollow cylinder 78 is so arranged to surround the conical outside surface of the rotator 73 across a viscous fluid containing space 77 having a predetermined radial width. The hollow cylinder 78 has a conical inside surface 79 tapered in parallel to the conical outside surface 72 of the rotator 73, and a generally cylindrical outside surface 81 having teeth 80 which is meshed with rack teeth 33 of a drive cord 32.

The hollow cylinder 78 is provided with a lid 82 on the top end thereof. An O-ring 83 is fitted into a spacing between the lid 82 and the upper reduced-diameter portion 74. An O-ring 85 is also fitted into a spacing between the bottom end 84 of the hollow cylinder 78 and the lower reduced-diameter portion 75 of the rotator 73. The hollow cylinder 78 has an annular inside stepped portion 86 extending from the underside of the hollow cylinder 78 to the bottom end of the conical inside surface 79 around the hollow shaft 70. On the other hand, the rotator 73 has an annular stepped portion 87 extending from the lower reduced-diameter portion 75 of the rotator 73 to the conical outside surface 72. The radial length of the inside stepped portion 86 is slightly larger than that of the stepped portion 87. Therefore, when the rotator 73 and the hollow cylinder 78 are fitted onto the hollow shaft 70, the rotator 73 and the hollow cylinder 78 define the viscous fluid containing space 77 therebetween.

A viscous fluid 88 such as a high-viscous silicone grease is injected into the viscous fluid containing space 77. The viscous fluid 88 transmits the rotation of the driving rotator 73 to the hollow cylinder 78 during normal load state to cause the hollow cylinder 78 to extend and draw the drive cord 32, so that the telescopic antenna 4 is extended or contracted. When a load exceeds a predetermined value on the other hand, the rotator 73 and the hollow cylinder 78 are disconnected in relation with the transmission of the driving force by a shearing action on the viscous fluid 88.

Figure 5:
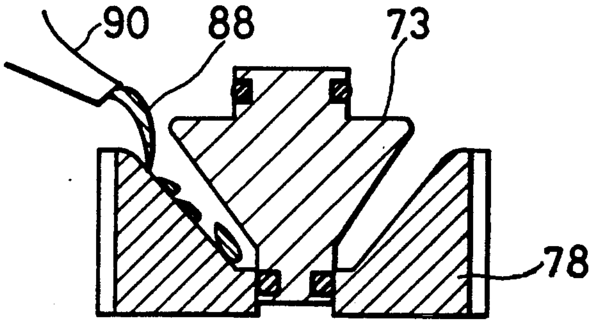
FIG. 5 is an illustration of an injection method of a viscous fluid into the space of FIG. 3.

As illustrated in FIG. 5, the viscous fluid 88 is injected into a space between the rotator 73 and the hollow cylinder 78 by an injection nozzle 90 in a state where the rotator 73 is lifted up from the hollow cylinder 78 relative to normal position thereof. In this case, since the viscous fluid 88 is injected into the space opened upwards, air escapes out of the viscous fluid 88 so that the viscous fluid 88 which has been injected contains no residual air bubbles. Therefore, the clutch mechanism can produce a stable torque. In addition, since the space 77 between the rotator 73 and the cylinder 78 is sealed by the O-ring 83 and 85, it is difficult for dust, water and mud to invade into the space 77. Thus, the clutch mechanism has a stable torque transmission efficiency. The method of injecting the viscous fluid 88 in this embodiment is applicable to the clutch mechanism of FIG. 1.

Thus, since in this embodiment the rotator 73 as the driving clutch member and the hollow cylinder 78 as the driven clutch member are combined and the viscous fluid containing space 77 defined therebetween is filled with the viscous fluid 88, the clutch mechanism is operated silently. In addition, since a torque from the rotator 73 to the hollow cylinder 78 is transmitted through the viscous fluid with no abradable parts, the clutch mechanism can be stably operated for a long period.

What is claimed is:

1. An apparatus for extending and contracting a telescoping antenna for a vehicle, comprising:
   - an electric motor having an output shaft to which a worm gear is mounted;
   - a driving clutch means connected to the electric motor to be rotated by said electric motor, the driving clutch means including a rotator, and a gear fitted to the rotator and having teeth on an outer periphery thereof, the teeth being in mesh with said worm gear;
   - a driven clutch member opposing said rotator to define a space in association with said rotator, the driven clutch member having teeth on an outer periphery thereof;
   - a drive cord connected to the telescopic antenna and having rack teeth meshed with the teeth of the driven clutch member; and
   - a fluid of high viscosity, the fluid being contained in said space, whereby the fluid transmits torque from the rotator to the driven clutch member based on a shear resistance of said high viscosity fluid when the driven clutch member is subject to normal load, the fluid being sheared when the driven clutch member is in an overload state, so that the rotator rotates relative to the driven clutch member.

2. The apparatus as defined in claim 1, wherein said rotator has a hollow cylindrical surface and said driven clutch member has a hollow cylindrical surface opposite to the cylindrical surface of said rotator, said cylindrical surfaces of said rotator and driven clutch member defining said space therebetween.

3. The apparatus as defined in claim 1, wherein said one end of said cylindrical surface of each of said rotator and driven clutch member is larger in diameter than the other end of said cylindrical surface of each of the rotator and driven clutch member.

4. The apparatus as defined in claim 1, in which the rotator transmits the driving force of said motor to said driven clutch member by means of a rotation of the rotator, said space being a uniform thickness along a direction of the rotation of said rotator.

5. The apparatus as defined in claim 3, in which the rotator transmits the driving force of said motor to said driven clutch member by means of a rotation of the rotator, said space being a uniform thickness along a direction of the rotation of said driving clutch member.

* * * * *